F. O. STILLMAN & H. M. SCHLEICHER.
SLIDE RULE.
APPLICATION FILED JULY 18, 1916.

1,250,379.

Patented Dec. 18, 1917.

Inventor:
Frederick O. Stillman,
Henry M. Schleicher,
by Roberts, Roberts & Cushman
Attys.

UNITED STATES PATENT OFFICE.

FREDERICK O. STILLMAN, OF MELROSE, AND HENRY M. SCHLEICHER, OF BOSTON, MASSACHUSETTS.

SLIDE-RULE.

1,250,379.     Specification of Letters Patent.     Patented Dec. 18, 1917.

Application filed July 18, 1916. Serial No. 109,973.

*To all whom it may concern:*

Be it known that we, FREDERICK O. STILLMAN and HENRY M. SCHLEICHER, both citizens of the United States, and residents of Melrose, in the county of Middlesex and Commonwealth of Massachusetts, and of Boston, in the county of Suffolk and said Commonwealth, respectively, have invented new and useful Improvements in Slide-Rules, of which the following is a specification.

This invention relates to a slide rule having one or more logarithmic scales divided into equal linear portions which are placed beneath one another in registry.

The preferred form of our improved slide rule differs from the ordinary Mannheim slide rule in the following respects: The logarithmic scale on it is divided into a suitable number of equal linear portions and these portions are placed in consecutive order one under the other, parallel to one another, and with each portion beginning in the same perpendicular line. Instead of having adjacent logarithmic scales to take the $n$th root of a number, each scale comprising $1/n$th of the longest logarithmic scale, our slide rule makes use of equally divided scales, one numbered from 1 to 10 and equal in length to one of the aforesaid equal portions of the logarithmic scale, the other, or each of the others, consisting of $n$ adjacent equally spaced proportionate scales each of which occupies a length equal to $1/n$th of the first mentioned equally spaced scale and is numbered from 1 to 10.

The principles involved in determining the portion of the scale in which the answer of any mathematical operation occurs permit the use of various methods. One of the methods involves the use of a member attached to the runner which can be moved independently of the runner. This part must have one or more initial lines or indexes to be set on certain portions of the logarithmic scale and have a pointer or other registering device for registering the distance from a certain portion to the portion of the logarithmic scale in which any particular number may occur. The distance between logarithmic portions, then, is added similarly to adding logarithmic distances, for the logarithms on a slide rule are equally spaced, the numbers corresponding being unequally spaced. Another method involves numbering the scale portions 0, 1, 2, 3, 4, . . . $n$, and using some adding device which will add up to $n$ and which, when 1 is added to $n$, will read 0. The first scale portion must be numbered 0, since the logarithm of 1 is 0.

An arrangement may also be utilized comprising a runner in which the glass is movable transversely of the rule whereby the glass may be moved without disturbing the longitudinal setting of the runner, and vice versa. Two parallel lines are marked on the glass perpendicular to the cross-hair in such a manner that, when the glass is in its uppermost position the two parallel lines register with the two longitudinal ruled lines of the uppermost portion or "0" line of the logarithmic scale mounted on one of the guides of the rule. If the runner glass is moved so that the two parallel lines register with the longitudinal ruled lines of the portion of the logarithmic scale in which the first factor of any mathematical operation occurs, the operator need not concern himself with the number of the logarithmic portion in which this factor occurs, since by so registering it he designates that portion of the logarithmic scale as the portion from which subsequently to begin counting.

Owing to the fact that the runner glass may be moved transversely while the runner is being moved longitudinally, the operator can register that portion of the stationary logarithmic scale in which the first factor occurs while positioning the runner with the cross-hair in registry with the factor. On the other hand, the number of the logarithmic portion of the slider scale in which the second factor occurs must be noted, since the result of the first operation is found in the stationary scale that number of logarithmic portions ahead or that number of logarithmic portions behind the logarithmic portion in which the first factor occurs according as the first operation is one of multiplication or one of division, as will be hereinafter more fully explained.

The uniformly spaced scales are parallel to the portions of the logarithmic scale, and begin and end in the extensions of the terminal lines thereof. The use of the equally spaced scales is based upon the fact that the divisions represent the logarithms of numbers, and taking $1/n$th of the logarithm of a number and finding the antilogarithm of that result, is equivalent to taking the $n$th root of the number where $n$ may have any value. Since only the mantissas of logarithms to the base 10 are used in plotting a slide rule scale, and since, if the characteristic is not evenly divisible by $n$, the mantissa of the logarithm is changed by dividing the logarithm by $n$, some provision must be made for the characteristic of the logarithm in finding the root of the number.

If the $n$th root of a number is desired, the number should be divided into groups of $n$ figures each, beginning with the decimal point and going to the left if there are any significant figures to the left of the decimal point or to the right if there are no significant figures to the left of the decimal point. The last group on the left may not have $n$ figures and if there is only one significant figure in the last group on the left, the root has the same sequence of figures as if the decimal point were between the first and second figure of the original number beginning on the left, that is, as if the characteristic of the logarithm of the original number were 0. If there are two significant figures in the last group on the left, the root has the same sequence of figures as if the characteristic of the logarithm of the original were 1. If there are $n$ significant figures in the last group on the left, the root has the same sequence of figures as if the characteristic of the logarithm of the original were $n$.

In addition to the equally divided scale in which the numbering 1 to 10 occupies a length equal to each of the equal portions of the logarithmic scale there is preferably a scale which is made up of $n$ equally divided adjacent portions in each of which the numbering 1 to 10 occupies a space equal to $1/n$th of the length of the equally divided scale first mentioned. The reading of the uniformly divided scale in which the numbering 1 to 10 occupies a length equal to that of each of the equal portions of the logarithmic scale, and which corresponds to the setting of the number in the logarithmic scale of which the $n$th root is desired (which is preferably fixed in relation to the uniformly divided scales) should be set in one of the $n$th portions of the $n$ uniformly divided adjacent portions. Whether the root occurs in the first, second, ... or $n$th portion of the $n$ uniformly divided adjacent portions depends upon the portion of the logarithmic scale in which the original number occurs, the value of $n$, and the number of figures in the last group on the left of the original number. No general rule can be given but the number of the portion and location therein where the root of a number occurs must be determined from a logarithmic table or by plotting logarithms.

The principal object of our invention is to provide a slide rule and a method for operating the same which will afford greater accuracy than the ordinary Mannheim slide rule, and yet occupy much less space than such a slide rule. By dividing each of the logarithmic scales into five equal portions, the same degree of accuracy can be attained with a rule five inches long as with a Mannheim rule twenty-five inches long. By dividing the logarithmic scale into ten equal portions, operations may be performed with a five inch rule equal in precision to a fifty inch Mannheim slide-rule.

A further object of our invention is to provide an improved method and means for performing processes of involution. A still further object is to provide a slide rule of the character described with a feasible and convenient runner.

Other objects will be apparent from the following description and accompanying drawings, in which—

Figure 1:
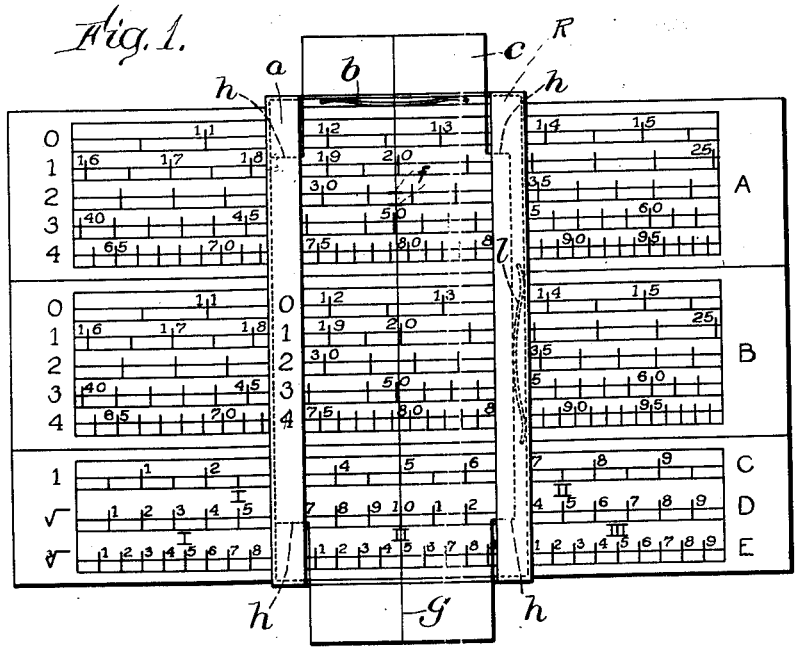
Figure 1 is an elevation of a slide rule embodying our invention.

Each of the embodiments of our invention illustrated in the drawings comprises a slide rule having five scales, namely, logarithmic scale A mounted on the upper guide; logarithmic scale B similar to scale A mounted on the slider; and three uniformly divided scales C, D and E mounted on the lower guide. The logarithmic scales A and B are each divided into five equal portions which are placed beneath one another in succession and in the embodiment of our invention shown in Fig. 1, the respective portions are numbered 0, 1, 2, 3, and 4, beginning with the upper portion of each scale. Inasmuch as the ends of the respective portions of the divided logarithmic scales do not ordinarily coincide with a regular division of the scale, the particular points where the divisions occur may be marked, if desired, at each end of each logarithmic portion.

The uniformly divided scales on the lower guide comprise one scale C having ten main divisions and other scales D and E, etc., depending upon the number of kinds of processes of involution for which the device is designed to be used. In the examples illustrated, only two additional scales are shown, scale D being adapted for use in taking square roots, and scale E being adapted for use in taking cube roots. Scale D comprises two similar portions I and II placed end to end, the two portions together being equal in length to scale C. Scale E comprises three uniformly divided portions I, II, III, arranged end to end, the three portions together being equal in length to scales C and D respectively. Other scales could obviously be provided to take the fourth, fifth ... $n$th roots by providing additional uniformly divided scales divided into 4, 5 ... $n$ parts, each scale being equal in length to scale C.

The scales C, D, E, etc., are designed to be used with a logarithmic scale such as A or B or other logarithmic scale divided into any desired number of equal portions, and for that reason scales C, D, and E, etc., are made equal in length to the superposed portions of the divided logarithmic scales. Scales C, D and E are preferably used with the scale on the upper guide inasmuch as these scales are relatively fixed one to the other, and therefore afford greater accuracy and rapidity than when using scales relatively adjustable, as for example, using scales C, D and E with scale B.

Our improved form of runner shown in Fig. 1, comprises the ordinary framework $a$ having end portions sliding on the edges of the upper and lower guides and the ordinary spring $b$ for holding it in longitudinally adjusted position. The runner is also provided with a movable runner glass $c$ which is transversely adjustable in guides extending along the transverse edges of the runner. A spring 1 is provided to frictionally engage the runner glass and hold it in transversely adjusted position. Two parallel longitudinal lines $f$ are made to extend on either side of the transverse hair-line $g$ to register with the portions of the logarithmic scale A. The four corners of the runner glass are cut away to provide shoulders $h$ coöperating at the ends of the runner to limit the transverse adjustment of the glass, so that the parallel lines $f$ will register with portion 0 of scale A when the glass is in the uppermost position, and with the portion 4 of scale A when the glass is in the lowermost position. The numbers of the portions of scale B are preferably placed on the edge of the runner in alinement with the respective portions of scale B so that the particular line in which the second factor of a number is found may be readily noted without shifting the eyes very far from the cross-hair over the registered number.

Figure 2:
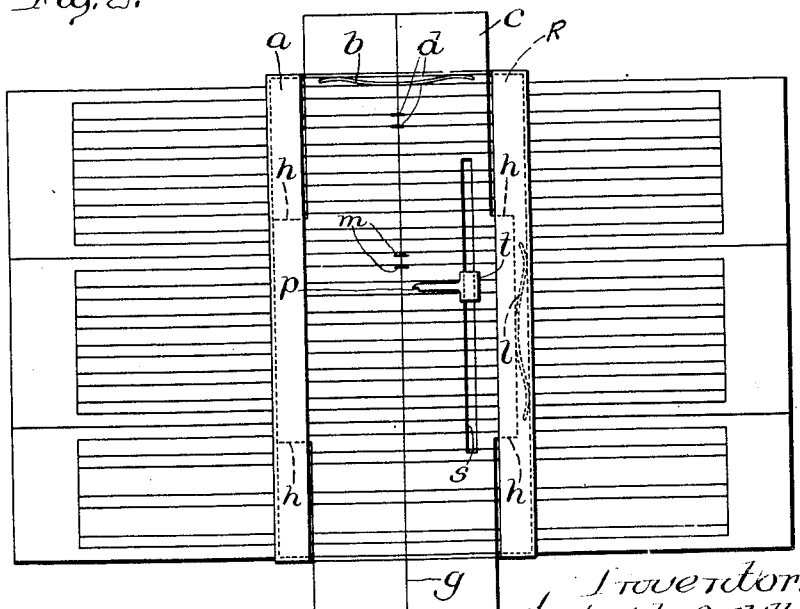
Fig. 2 is an elevation of a slide rule embodying a modification of our invention.

The embodiment of our invention shown in Fig. 2 is identical with that shown in Fig. 1, except in the following respects: Instead of the single pair of parallel longitudinal lines $f$, two sets of such lines $d$ and $m$ are provided, the set $d$ being placed at such position on the glass runner as to be in registry with the first portion of scale A when the glass runner is in the mid-position shown in the drawing. The lines $m$ are positioned below the last portion of scale A a distance equal to the transverse distance between any two adjacent portions of scale A or scale B, the distance between adjacent portions of scales A and B respectively being equal. A pointer $p$ is arranged to be adjusted transversely of the rule in a slot $s$ in the runner glass, the slot $s$ being long enough to permit the pointer $p$ to be in position over any portion of scale B when either of the parallel lines $d$ or $m$ are positioned over any one of the portions of scale A. The pointer $p$ may comprise a flat piece of aluminum of substantially the shape shown and of the thickness of the guides so that it will not project above the plane of the guides. The means for guiding the pointer in the slot $s$ may comprise a thin plate of aluminum of substantially the shape of the portion $t$ of the pointer $p$ positioned beneath the portion $t$ and connected thereto by means of a spacing member of substantially the thickness of the glass and of substantially the width of the slot $s$. A longitudinal recess may be formed on the under side of the runner glass on each side of and parallel with the slot $s$ to receive the lower aluminum guide plate, the depth of the recesses being equal to the thickness of the plate whereby the runner glass may be mounted to move in close proximity to the face of the rule. The pointer $p$ preferably extends into the region of the hair line $g$. It will be understood that the member $p$ transversely adjustable on the glass runner may take other forms than the particular form disclosed in Fig. 2.

In using our improved slide rule for performing processes of involution tables such as given below may be conveniently employed to indicate the proper portions of the scales on the upper and lower guides respectively for any particular operation. Table I is for use in finding square roots or cube roots with a rule such as shown in the drawing where the logarithmic scale is divided into five portions, 0, 1, 2, 3 and 4, and Table II is for use in finding square roots or cube roots with a rule having the logarithmic scale divided into ten portions, 0, 1 . . . 9.

Table No. I.

|  | $\sqrt{m}$ | $\sqrt{10m}$ | $\sqrt[3]{m}$ | $\sqrt[3]{10m}$ | $\sqrt[3]{100m}$ |
|---|---|---|---|---|---|
| Log portion No. 0.... | I–0 | II–2 | I–0 | III–1 | II–3 |
| "      "      "  1.... | II–0 | I–3 | II–0 | I–2 | III–3 |
| "      "      "  2.... | I–1 | II–3 | III–0 | II–2 | I–4 |
| "      "      "  3.... | II–1 | I–4 | I–1 | III–2 | II–4 |
| "      "      "  4.... | I–2 | II–4 | II–1 | I–3 | III–4 |

Table No. II.

|  | $\sqrt{m}$ | $\sqrt{10m}$ | $\sqrt[3]{m}$ | $\sqrt[3]{10m}$ | $\sqrt[3]{100m}$ |
|---|---|---|---|---|---|
| Log portion No. 0.... | I–0 | I–5 | I–0 | II–3 | III–6 |
| "      "      "  1.... | II–0 | II–5 | II–0 | III–3 | I–7 |
| "      "      "  2.... | I–1 | I–6 | III–0 | I–4 | II–7 |
| "      "      "  3.... | II–1 | II–6 | I–1 | II–4 | III–7 |
| "      "      "  4.... | I–2 | I–7 | II–1 | III–4 | I–8 |
| "      "      "  5.... | II–2 | II–7 | III–1 | I–5 | II–8 |
| "      "      "  6.... | I–3 | I–8 | I–2 | II–5 | III–8 |
| "      "      "  7.... | II–3 | II–8 | II–2 | III–5 | I–9 |
| "      "      "  8.... | I–4 | I–9 | III–2 | I–6 | II–9 |
| "      "      "  9.... | II–4 | II–9 | I–3 | II–6 | III–9 |

In each table the first vertical column designated $\sqrt{m}$ is for use in finding the square root of a number having one significant figure in the left hand group of figures, the figures of the number being divided into groups of two figures in a group beginning at the decimal point, in the well-known manner; column $\sqrt{10m}$ is for finding the square root of a number having two significant figures in the left-hand group; column $\sqrt[3]{m}$ is for finding the cube root of a number having one significant figure in the left-hand group of figures, the figures of the number being divided into groups of three figures in a group beginning at the decimal point, in the well-known manner; column $\sqrt[3]{10m}$ is for finding the cube root of a number having two significant figures in the left-hand group; and column $\sqrt[3]{100m}$ is for finding the cube root of a number having three significant figures in the left-hand group. The horizontal column designated "Log portion No. 0" is for use where the number, the root of which is desired, is found in the No. 0 portion of the divided logarithmic scale, etc. It will be noted that each frame of the tables includes a Roman numeral and an Arabic numeral. The Roman numeral indicates the portion of the scale D, or E, etc., to employ in finding a square root, or a cube root, etc. The Arabic numeral indicates the portion of the divided logarithmic scale A or B in which the result of the operation may be found.

The operation of the embodiment of our invention shown in Fig. 1 is as follows:

*Multiplication.*—Find the first factor of the product in the scale on the upper guide and set the cross-hair of the runner in registry therewith, at the same time placing the two parallel lines, which are perpendicular to the cross-hair in registry with the two longitudinally-ruled lines of the logarithmic portion of the said scale in which the first factor occurs. Bring either the left or the right-hand index of the slider under the cross-hair of the runner, depending upon which setting will bring the second factor inside the two indices of the scales on the guides. Find the second factor in the slider scale and set the cross-hair of the runner in registry therewith, without changing the position of the two parallel cross-hairs; note the number of the logarithmic portion of the slider scale in which the second factor occurs, and note whether the left-hand index of the slide is to the left of the left-hand index on the guides. If no further operations are to be performed, find the answer under the cross-hair in the scale on the upper guide a number of logarithmic portions ahead of the logarithmic portion registered by the two parallels equal to the number of the logarithmic portion of the slider scale in which the second factor occurs, increased by 1 if the left-hand index of the slider is to the left of the left-hand index on the guides. If another multiplication is to be performed, move the two parallels on the runner to register with the two longitudinally ruled lines of the logarithmic portion in which the product of the first multiplication occurs and proceed as before. Since the logarithmic portions are numbered 0, 1, 2, 3, 4, . . . $n$, $n$ plus 1 is taken as 0.

For example, in multiplying 7 by 2, find the number 7 in the fourth portion of the logarithmic scale in scale A; adjust the runner R longitudinally so that the transverse hair-line on the runner glass is over the number 7; adjust the runner glass transversely until the two longitudinal hair-lines register with the fourth portion of scale A in which number 7 was found; adjust the slider until the proper end index line thereof registers with the hair-line which is already in registry with 7, the proper index line being the left-hand index in this example, namely, the one the described registering of which causes the second factor 2 to be positioned between the two indices of the scale A; shift the runner without disturbing the transverse adjustment of the runner glass, so that the hair-line registers with the second factor 2 in the slider scale; note the number, 1, of the portion of the scale B in which the second factor 2 is found; count downwardly from the line of the scale A indicated by the previous setting of the parallel lines on the runner glass a number of lines equal to the previously found number, 1, which in this example takes one back to line zero inasmuch as the first factor 7 was in line 4; and, finally, find the answer under the hair-line in the portion of the upper scale A thus determined, the answer in the example being 14. Had the slider extended to the left instead of to the right the number of the line of the scale B in which the second factor was found should have been increased by 1; thus, the answer would have been found in line 1 instead of line 0 of scale A.

*Division.*—Set the dividend the same way that the first factor was set in multiplication and bring the divisor under the cross-hair of the runner. If no further operations are to be performed, find the answer in line with the slider index (which is between the indices on the guides) the same number of logarithmic portions behind the logarithmic portion which is registered by the two parallels as the number of the logarithmic portion in which the divisor occurs, decreased by 1, if the left hand index of the slide is to the left of the left hand index on the guides. If another division is to be performed, move the two parallels on the runner so that they register with the two longitudinally ruled lines of the portion of the logarithmic scale in which the quotient of the first division occurs and proceed as before.

To divide 55 by 5, adjust the slider longitudinally until the hair-line registers with 55 in line 3 of scale A; adjust the runner glass transversely until the parallel lines $f$ register with line 3 of scale A; adjust the slider longitudinally until the divisor 5 in line 3 of scale B is under the hair-line; noting that the divisor 5 is in line 3 of scale B, shift the runner to the left until the hair-line is in registry with the left-hand index line of scale B, and subtract from the number of the line of scale A indicated by the parallel lines $f$, in which the quotient 55 was found the number of the line of scale B in which the divisor 5 was found, that is, subtract from the former number 3 the latter number 3 and since the difference is 0, the answer is found in line 0 of scale A, the answer being 11 in this example.

*Involution.*—Set the number, of which the $n$th root is desired, on the slider or on the upper guide according as the logarithmic scale on the slider or on the upper guide is used. Take the reading on the equally divided scale of which the numbering 1 to 10 occupies a length equal to that of each of the equal portions of the logarithmic scale. Set this reading in the proper part of the uniformly divided scale which is made up of $n$ equally divided adjacent parts as indicated by the corresponding table. The answer occurs somewhere under the cross-hair in the logarithmic scale as indicated by the corresponding table. The above Tables I and II give the location of square roots and cube roots where the total numbers of logarithmic portions are 5 and 10, respectively.

In taking the square root of 49, for example, adjust the runner until the hair-line registers with the number 49 in scale A, and note the reading of scale C at the point beneath the hair-line, which in this case is about 45; note in Table I the two numbers corresponding to 49, the two numbers being I and 4, inasmuch as 49 occurs in log portion No. 3 of scale A, and inasmuch as there are two figures in 49 making the number correspond to the square root of $10m$. The Arabic numeral 4 indicates that the answer will be found in the fourth line of scale A, and the Roman numeral I indicates that the position of the answer in line 4 of scale 1 will be directly above the position in portion I of scale D of the reading previously taken in scale C beneath the original number 49.

In taking the cube root of a number, the operation is precisely the same except that the cube root portion of the table is employed, and scale E is employed in lieu of scale D. Obviously any other $n$th root could be taken by means of an additional scale uniformly divided into $n$ portions.

The operation of the embodiment of our invention shown in Fig. 2 is the same as that shown in Fig. 1 except in respect to the manner of locating the particular portion of the divided logarithmic scale A in which the result of one or more operations of multiplication or division may be found. In this respect the portion of scale A containing the answer is indicated by means of the parallel lines $d$ or $m$, thus eliminating the mental process of adding or subtracting the number of the portion of scale B, in which the second factor is found, to the number of the portion of scale A in which the first factor is found, in order to determine the number of the portion of scale A in which the result may be found. For this reason the portions of scales A and B are not numbered in this modification of our invention, although they might obviously be numbered as in Fig. 1 if desired.

In performing the process of multiplication with the modified embodiment of our invention, the first factor or the result of a previous operation is located in scale A, and the parallel lines $m$ are placed in registry with the portion of the scale in which the first factor is found, while the hair-line $g$ is placed in registry with the first factor; then bring either the left or the right index of the slider under the cross-hair of the runner, depending upon which setting will bring the second factor inside of the two indices of scale A. Find the second factor in scale B and set the cross-hair of the runner in registry therewith without changing the position of the two parallel cross-hairs; adjust the pointer $p$ transversely of the rule until it registers with the first portion of scale B; and move the glass runner transversely of the rule until the pointer $p$ carried thereon registers with the portion of scale B in which the second factor occurs. If the slider extends to the right of the rule the result of the operation may then be found in scale A beneath the cross-hair $g$ and beneath the parallel lines $m$ or $d$, depending upon which of these two pairs of lines are above scale A; if the slider extends to the left of the rule the result will be found one portion lower.

In performing the process of division with the rule illustrated in Fig. 2, find the first factor, or the result of a previous operation, in scale A and set the cross-hair $g$ in registry therewith; adjust the runner glass transversely of the rule until the parallel lines $d$ register with that portion of scale A in which the first factor occurs; find the second factor in scale B and bring it under the cross-hair of the runner; adjust the pointer $p$ transversely of the rule until it registers with that portion of scale B in which the second factor occurs; adjust the runner longitudinally of the rule until the cross-hair $g$ registers with that index of the slider which is positioned between the two indices of scale A; and adjust the glass runner transversely of the rule until the pointer *p* registers with the first portion of scale B. If the slider extends to the right of the rule the answer may then be found under the cross-hair *g* in that portion of scale A with which the parallel lines *d* or *m* register, depending upon which pair of parallel lines is positioned above scale A; if the slider extends to the left of the rule the answer may be found one portion higher.

It is understood that the word "product", used in the claims, designates the result of an operation either of multiplication or of division, inasmuch as an operation of division involves multiplying the dividend by the inverse of the divisor.

We claim:

1. A slide rule comprising a guide member, a slider member, a scale on each of said members comprising consecutive superposed registering portions of a continuous logarithmic scale, and a cursor transversely movable with respect to the scales, the cursor having means for registering a factor in one scale transversely with respect to another factor in the other scale in such manner as to indicate the portion of the first scale containing the product of the two factors.

2. A slide rule comprising a scale member, a second scale member movable relatively thereto, and a scale on each of said members comprising consecutive superposed registering portions of a continuous logarithmic scale, a runner mounted for longitudinal movement along said scales, and means on the runner arranged to be placed in transverse registry with certain of the said portions to indicate the particular portion containing the result of an operation.

3. A slide rule comprising a scale member, a second scale member movable relatively thereto, and a scale on each of said members comprising superposed registering portions of a continuous logarithmic scale, and a cursor mounted on one of said members for longitudinal and transverse movement over said scales, the cursor having index means which may be placed in registry with longitudinal points on the scales and having other index means which may be placed in registry with the respective portions of the continuous logarithmic scales.

4. A slide rule comprising a scale member, a second scale member movable relatively thereto, a scale on each of said members comprising superposed registering portions of a continuous logarithmic scale, the said portions being consecutively arranged, a runner mounted for longitudinal movement along said scales, a cursor mounted for transverse movement across said scales, the cursor having index means which may be placed in registry with any desired one of said scale portions, and a pointer movably mounted in such manner that it may be placed in registry with any desired one of said scale portions.

5. A slide rule comprising a logarithmic scale, a uniformly divided scale having ten main divisions, a second uniformly divided scale comprising a plurality of similar portions each having ten main divisions, said scales being superposed in registry, and a cursor movable thereover, whereby the root of a number corresponding to the number of similar portions of the second uniformly divided scale may be obtained.

6. A slide rule comprising a guide and a slider, a scale on the guide and slider, respectively, each scale comprising equal consecutive parallel portions of a continuous logarithmic scale complete within the limits of unit change in characteristic, and a cursor adjustable thereon, said portions being so positioned that with the slider in normal position the cursor will register with one end of each portion when in one position and with the other end of each portion when in another position, the number of parallel portions in the respective scales bearing such relation to each other and the portions of one scale being consecutively numbered in such manner that the number of the portion of the one scale in which one factor of a product is found indicates the number of portions between the portion containing the other factor and the product, respectively, in the other scale.

7. A slide rule comprising a guide and a slider, a scale on the guide and slider, respectively, each scale comprising equal consecutive parallel portions of a continuous logarithmic scale complete within the limits of unit change in characteristic, and a cursor adjustable thereon, said portions being so positioned that with the slider in normal position the cursor will register with one end of each portion when in one position and with the other end of each portion when in another position, the number of parallel portions in the respective scales bearing such relation to each other that the positions in the respective scales of the portions containing the two factors of a product indicate the portion of one of the scales containing the product.

Signed by us at Boston, Massachusetts, this 23rd day of June, 1916.

FREDERICK O. STILLMAN.
HENRY M. SCHLEICHER.